(12) United States Patent
Blondia

(10) Patent No.: US 7,675,244 B2
(45) Date of Patent: Mar. 9, 2010

(54) SYSTEM AND METHOD FOR POWER SUPPLY FOR LAMP WITH IMPROVED CONSTANT POWER MODE CONTROL AND IMPROVED BOOST CURRENT CIRCUIT

(75) Inventor: Rudi Blondia, Fremont, CA (US)

(73) Assignee: Perkinelmer Optoelectronics, N.C., Inc., Fremont, CA (US)

( * ) Notice: Subject to any disclaimer, the term of this patent is extended or adjusted under 35 U.S.C. 154(b) by 820 days.

(21) Appl. No.: 11/444,716

(22) Filed: Jun. 1, 2006

(65) Prior Publication Data
US 2007/0001624 A1    Jan. 4, 2007

Related U.S. Application Data

(60) Provisional application No. 60/695,195, filed on Jun. 29, 2005.

(51) Int. Cl.
*H05B 37/02* (2006.01)
(52) U.S. Cl. .................. 315/291; 315/307; 315/209 R
(58) Field of Classification Search ............... 315/307, 315/308, 291, 289, 209 R, 224, DIG. 5, DIG. 7
See application file for complete search history.

(56) References Cited

U.S. PATENT DOCUMENTS

| | | | |
|---|---|---|---|
| 3,967,159 A | 6/1976 | Dendy et al. | 315/247 |
| 4,039,897 A | 8/1977 | Dragoset | 315/205 |
| 5,034,663 A | 7/1991 | Cook, II et al. | 315/308 |
| 5,036,256 A | 7/1991 | Garrison et al. | 315/308 |
| 5,039,921 A | 8/1991 | Kakitani | 315/307 |
| 5,046,152 A | 9/1991 | Bartscher | 315/307 |
| 5,103,143 A | 4/1992 | Daub | 315/308 |
| 5,204,587 A | 4/1993 | Mortimer et al. | 315/308 |
| 5,212,428 A | 5/1993 | Sasaki et al. | 315/308 |
| 5,612,597 A | 3/1997 | Wood | 315/293 |
| 5,677,602 A | 10/1997 | Paul et al. | 315/224 |
| 5,698,952 A | 12/1997 | Stebbins | 315/307 |
| 5,721,465 A | 2/1998 | Roberts | 313/46 |
| 5,731,665 A | 3/1998 | Pruett | 315/247 |
| 5,742,134 A | 4/1998 | Wacyk et al. | 315/307 |
| 5,925,990 A | 7/1999 | Crouse et al. | 315/307 |
| 6,075,326 A | 6/2000 | Nostwick | 315/307 |
| 6,114,814 A | 9/2000 | Shannon et al. | 315/219 |
| 6,118,415 A | 9/2000 | Olson | 345/41 |
| 6,181,053 B1 | 1/2001 | Roberts | 313/46 |

(Continued)

FOREIGN PATENT DOCUMENTS

WO     WO 2004/084585 A2     9/2004

*Primary Examiner*—Douglas W Owens
*Assistant Examiner*—Ephrem Alemu
(74) *Attorney, Agent, or Firm*—Morrison & Foerster LLP

(57) ABSTRACT

A power supply and method for operating a power supply for a short arc lamp are provided herein. The power supply and method can operate to provide to a number of advantageous operations. One aspect herein provides a power supply which utilizes a constant power mode type of operation. However, the constant power mode is modified to allow for some variation in power in order to provide for a more constant light output by the lamp. A second aspect herein provides for controlling the operation of a boost voltage applied to the lamp at start up. This control allows for adjusting the applied boost voltage to accommodate the changing characteristics of the lamp itself, and these adjustments can allow for extended life of the lamp.

19 Claims, 9 Drawing Sheets

U.S. PATENT DOCUMENTS

| | | | |
|---|---|---|---|
| 6,181,077 B1 | 1/2001 | Greenland | 315/225 |
| 6,181,084 B1 | 1/2001 | Lau | 315/291 |
| 6,316,867 B1 | 11/2001 | Roberts et al. | 313/113 |
| 6,515,430 B2 * | 2/2003 | Kayser | 315/224 |
| 6,515,882 B2 | 2/2003 | Moriguchi et al. | 363/97 |
| 6,608,452 B1 | 8/2003 | Holmes | 315/307 |
| 6,686,702 B1 | 2/2004 | Holmes | 315/247 |
| 6,794,832 B2 * | 9/2004 | Yamamoto et al. | 315/307 |
| 6,984,943 B2 * | 1/2006 | Ono et al. | 315/291 |
| 2003/0173911 A1 | 9/2003 | Ohsawa | 315/291 |
| 2006/0197470 A1 * | 9/2006 | Ribarich et al. | 315/291 |

* cited by examiner

SYSTEM AND METHOD FOR POWER SUPPLY FOR LAMP WITH IMPROVED CONSTANT POWER MODE CONTROL AND IMPROVED BOOST CURRENT CIRCUIT

PRIORITY

This application claims priority to U.S. Provisional Patent Application Ser. No. 60/695,195, filed Jun. 29, 2005, the disclosure of which is incorporated herein by reference.

FIELD OF THE INVENTION

The present invention relates to the field of power supplies for providing for stable and prolonged operation of short arc xenon lamps.

BACKGROUND

High Intensity Short Arc Xenon Lamps are used in a variety of projection applications such as theater film projectors, high-end slide projectors and, Digital Video and Data Projection.

The Xenon lamp's output light intensity is generally defined by $lm = K \times I_{(op)}^X$ with K being a constant and $1.2 < X < 2.5$, and both K and X are a function of lamp design parameters. Lamp output is defined by operating current for any given Xenon lamp design. Generally, in order for the output of a short arc xenon lamp to remain constant in an application the operating current needs to be kept constant.

A number of short arc power supply topologies have been developed to operate DC xenon arc lamps and DC xenon/mercury arc lamps. The "constant current mode ballast" (CCM) is popular as it is designed to keep the operating current constant over life of the lamp. This approach is straightforward but has some limitations. One limitation is that the thermal load on the lamp increases over life as the operating voltage of xenon short arc lamps increases due to electrode burn back. This requires the cooling for the lamp to be variable or designed for worst thermal load condition over the life of the lamp. Although the CCM solution can be acceptable for a number of applications, a different operating mode, as discussed below, has developed to provide a more constant thermal load over life of the lamp. Another risk with a CCM power supplies is that it can cause the overall power consumption to exceed the maximum allowable power consumption over life of the lamp.

The "constant power mode ballast" (CPM) addresses some of the limitations of the CCM ballast, by calculating power consumption of the lamp and adjusting the operating current over life in such a way the operating power remains constant. Generally, as the operating voltage of the lamp increases over life, the CPM power supply decreases the amount of current. This is a process playing over many thousand hours; many designers prefer the resulting decrease of output light intensity, to the thermal load increase in the CCM configuration.

In some of the prior CPM approaches the operating current and operating voltage of the power supply or ballast to the lamp are used to implement the CPM topology. By multiplying current and voltage the operating power of the lamp is determined. This signal is compared to a set level of desired operating power required for the application. The resulting error signal is utilized to drive the operating current of the lamp. As the operating voltage of the lamp changes over time due to electrode burn back, so will this topology decrease drive current to keep the $V_{op} * I_{op}$ product constant, where the power corresponds to $V_{op} * I_{op}$.

The typical CPM ballast does an excellent job at keeping the thermal load constant at the cost of allowing for a variable operating current drive as a function of the operating voltage of the load.

As long as the operating voltage changes gradually, the output of the lamp will change gradually without any perceptual effects on the operation of the xenon lamp in aforementioned applications. However, a problem can arise where there are rapid and/or unstable fluctuations in the voltage across the lamp.

Many short arc xenon lamps are used in projectors or applications where observation by eye or camera is required. Keeping the light output in these applications constant is a major requirement and often the stability of the system is defined as a percentage level of output over a frequency range. The average human eye is sensitive to intensity variations in the 0-30 Hz frequency band and is capable of dissolving smaller than 1% intensity variations of full scale in the 9-11 Hz range at comfortable brightness levels. Sensitivity to changes is reduced at either end of this spectrum. Any perceivable intensity change that's noticeable is commonly referred to as "flicker".

It is clear that slow light output changes as caused by electrode burn back will not be noticed as the frequency of the change approaches 0 Hz. The design of a short arc lamp, is well known, and includes generally includes two electrodes, an anode and a cathode, disposed in a gas region. Aspects of different elements of short arc lamps are described for example, in U.S. Pat. Nos. 5,721,465; 6,181,053; and 6,316,867 each of which is incorporated herein by reference. When a trigger voltage is applied across the electrodes the gas becomes conductive, and a dc voltage applied across the electrodes, results in current being conducted through the gas, and light is emitted by the lamp. Over usage of the lamp, the metal of the electrodes can erode, which is referred to as burn back. Electrode burn back is generally a gradual process, and as the electrodes burn back the impedance of the lamp will generally increase.

There are also other more rapidly varying processes which change the impedance and arc stability over the life of the lamp. The effects of these processes on system stability have not been accounted for in many prior systems. Examples of some processes that affect the operating voltage of the lamp and contribute to the changing impedance of the lamp, include:

a) Aging
b) Cathode work function changes
c) Thermal system effects
d) Micro-phonics
e) Arc Jump and Arc Wander
f) Any transient combination of above
g) Electrode morphology changing lamp operating processes.
h) Electrode evaporation due to excessive inrush current.

The above processes contribute to voltage changes in the lamp, and the CPM type system 100 of FIG. 1 will automatically adjust the operating current output by the power to the lamp, so as to keep operating power constant. This automatic adjustment of the current output by the power supply will also affect the output of the lamp and magnify the instability.

FIG. 1 shows an illustration of prior art CPM control circuitry 100 for a power supply driving a lamp. Inputs 102, 104, from J1 are signals which are detected from the operation of the lamp. The signal 102 corresponds to a voltage detected across the lamp. The signal 104 corresponds the current transmitted through the lamp. The chip U1 is an analog multiplier circuit. The current signal 102 and the voltage signal 104 are input to pins 112 and 116 of the analog multiplier circuit U1.

The product of these two signals is then output on pin 122 to J2 where it can be used to make adjustments to the power supply outputting current to the lamp.

Also it should be noted that the changing operating current of the lamp further contributes to variations in the internal processes of the lamp, which leads to further changes in the operation of the lamp. If any of these processes affects the impedance of the lamp, system feedback with oscillation can result. The frequency of the oscillation is function of the timescale of the impedance changing process and the associated input/output system gain. After all, an oscillator can be no more than an amplifier with time function dependent gain feedback from output to input.

The resulting AC+DC operation of the lamp can result in rapid degradation of the electrodes in addition to making the output of the lamp unsuitable for some applications. This accelerated degradation can be a run-away process that accelerates the aging of the lamp.

An additional aspect of the operation of xenon short arc lamp is providing circuitry necessary to start the operation of the lamp. It is well documented that xenon short arc lamps to require a "boost circuit" to reliably start the lamp over life of the lamp. Critical boost circuit parameters are open load voltage, boost circuit energy and RC time or boost peak current time.

Since the impedance during the ignition phase of the lamp is initially very high as the gas in the lamp is not initially conductive, and the impedance does not immediately drop to a low value (<1 ohm for most xenon lamps), a high "open-load" voltage is used to speed up ionization in the lamp to establish a stable plasma. Indeed, a higher voltage will develop a higher current for given impedance at any time.

The boost phase "widens" the narrow discharge streamer of conductive gas between the anode and the cathode of the lamp generated in the ignition or trigger phase. By depositing more energy in the streamer, the boost voltage drives the impedance of the lamp low enough for the DC phase to take over FIG. 2a illustrates an embodiment of a prior lamp system and power supply of the prior art. Initially, a trigger pulse supply 202 having a voltage in the range of 30-45 kV, for example, applies a large voltage pulse through a pulse transformer 216 to the lamp 218. This trigger pulse applies initial energy to the gas between the electrodes of the lamp. Subsequent to the trigger pulse, which lasts for in the range 1 μsec, the boost voltage is applied to the lamp 218 for a time period in the range of 0.3-2.5 msecs.

A general illustration of typical boost circuit of the prior art is shown in FIG. 2a; it includes a high voltage source 204 (100-450 volt DC) charging a capacitor 213 which is in series with a resistor 214. A switch configuration (not shown) can be used to discharge this capacitor 213 through the same or a different resistor into the lamp after ignition. In another configuration a PTC (positive temperature coefficient resistor can be used, which operates to initially have a low resistance value allowing for transmission of boost current, and then as the temperature of the PTC increases the resistance of the PTC increases, and the boost current is decreased. The diodes 210 and 212 can be deployed to keep boost circuit and DC circuit separated. These diodes can also be typically part of the rectification circuit of the DC generating circuit; they are shown in the circuit of FIG. 2a to illustrate that to ignite a short arc xenon lamp of the type used in projector type of applications multiple DC and AC sources are combined or OR'ed together for all the transitions to happen. The capacitor 213 and the resistor 214 in series in 2A are the typical boost capacitor and boost resistor.

FIG. 2b illustrates the operation of a prior boost circuit. From a time period 0 to 1 μs (220) the trigger voltage is applied to the lamp. This trigger voltage results in little current through the lamp due to the high impedance. Subsequent to the trigger pulse a boost voltage is applied to the lamp by the capacitor of the boost circuit for period of time 222. In one embodiment this time period can range for 0.3 to 2 ms and this boost voltage, particularly during the early part of the life of the lamp will cause the current flowing through the lamp to exceed the desired operating current, for a period of time 224. As the lamp ages the period of time during which the current exceeds the operating current will decrease because the impedance of the aging lamp will increase. Once the boost voltage has been applied for a sufficient amount of time, the gas will be conductive enough for the lower voltage of the DC source 206 to be sufficient to sustain the operation current through the lamp. The problem with many prior boost circuit systems is that they can cause the lamp to age more quickly than necessary by causing an excess amount of current to flow through the lamp during start up. The choice for an excessive amount of current is actually determined by the "one fits all" design concept of old art approaches as depicted in FIG. 2a.

DETAILED DESCRIPTION

Figure 1:
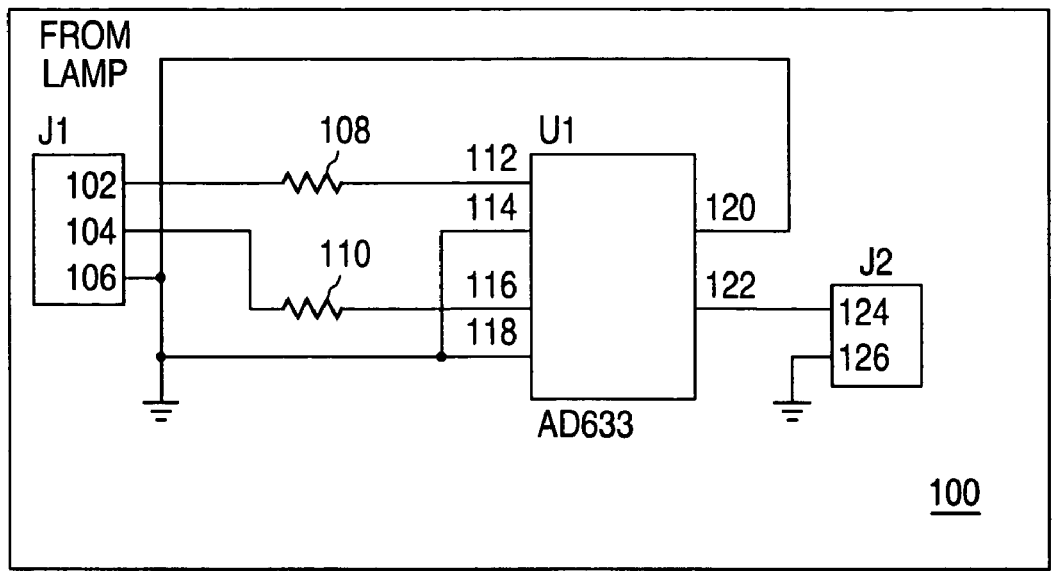
FIG. 1 shows an embodiment of control circuitry for a prior art power supply for driving a lamp.

An embodiment of the present invention addresses many of the limitations of prior art power supplies. One of the elements in an embodiment herein is to use a smoothed, or average, or mean, or Root Mean Square (RMS) of the operating voltage of the lamp to calculate the operating power rather than using the instantaneous voltage or peak voltage across the lamp at a given point in any time.

By selecting the proper averaging time for the operation of the lamp, instantaneous changes in voltage or impedance of the lamp plasma are not translated immediately to operating current changes. The net result is a significantly lower rate of change in the light output by lamp. It should be clear that for anyone skilled in the art of electrical oscillator and amplifier system design that this equates to a rolling off of the amplifier closed loop servo system gain over time to ensure stable operating for all load and output-input feedback conditions. It is common practice in closed feedback loop control systems to tailor the time/gain response to exclude inputs that adversely affect the output performance of the system. Generally, prior art lamp projector/ power supply systems in projection devices with constant power mode configuration, are not optimized to minimize instabilities in the output light visible to the viewer of such projection systems. By providing filtering (analog or digital filtering) in the control loop to limit the bandwidth of the control loop, one avoids oscillatory operation in those regions where output and input of the system are 180 degrees out of phase, which can result in undesirable oscillations.

In relatively high bandwidth feedback loop systems, the event of an input transient, such as sudden plasma impedance change, results in instable operation sustained which can then be perpetuated by the servo (control loop) system through electrode thermal interaction, and the light output of the system will show oscillatory instabilities which are observable by the viewer of the projector system.

An example of the above effects can be illustrated by considering the operation of a lamp in projector system. In a situation where the lamp power output by the lamp has been determined to exceed some desired level, the control of the power supply will then cause a decrease in the current output by the power supply and transmitted through the lamp. This change in the current in the lamp will cause an initial short-term change in the resistance of the lamp as a result of the change in current. In prior CPM system, this resulting resistance change would create feedback which would cause the current from the power supply to be increased, which would result in another change in the resistance of the lamp, and then another subsequent change in the current would result. This interaction could result in oscillatory type changes in the intensity of the light output which could be visible to an observer of the projector system. An embodiment herein provides for a solution which filters out the effect of the short-term changes in the characteristics of the lamp, which result in short term changes of the power output by the lamp.

In various tests of various lamps used in different illumination projection type systems it has been found that filtering with a time constant of greater than around 1 second will be provide for adequate attenuation of the effects of short term changes in the impedance of the lamp so as to keep the output of the lamp stable. There are of course many ways to characterize the operation of filtering. In general, it has been found that providing for either digital or analog filtering which filters out changes in voltage across the lamp, which occur over relatively short time periods, say 0.1 or shorter seconds, corresponding to a frequency in the range 10-2000 Hz, by a factor of at least 2 will significantly improve the stability of output light as observed by the human eye. Further, it should be recognized that most filtering schemes would operate not to completely eliminate the effect of short-term changes voltage across the lamp, but rather to attenuate such fluctuations in the voltage.

Also it should be noted that an RC time constant of 1 second correspond to a low pass filter with a corner frequency cutoff of about 0.16 Hz. Further it is widely known that a multitude of digital implementations and other analog configurations can be used to approximate, and in some cases enhance the type of low pass filtering provide by a simple RC filter. The time constant of 1 second will generally be indicative of the of the cutoff frequency for the low pass filtering in a range of different filter types whether digital or analog as discussed herein.

By selecting a proper compromise for a system time constant, or averaging time period, one can extend the range and time of stable operating light output, and provide for stable illumination for an observer of an imaging/illumination system, while keeping many of the thermal benefits of constant power mode operation. This compromise recognizes that from maintaining a constant power perspective one would like to change the current instantaneously in response to a change in power, but from an output light stability standpoint one would like to reduce the amount of change in current driving the lamp. Stated differently, an embodiment herein makes a compromise between thermal load stability and output light stability, where some fluctuation in the thermal load, with acceptable lamp operating conditions, is allowed in order to obtain greater output light stability.

The thermal time constant of xenon lamps and the power operating margin range is a function of the construction the lamp and the operating power of the lamp. The time constant for quartz bubble xenon short arc lamps is relatively short while for ceramic body type lamps, which have more mass than the quartz bubble type lamps, a longer thermal time constant is obtained.

There are a wide range of processing techniques for obtaining and utilizing some sort of smoothing for instantaneous operating voltage. However, one should recognize that use of the terms smooth, smoothing, average, or averaging, is not meant to be limited to the exemplary techniques smoothing type techniques discussed herein.

First Order Low Pass Filter

Figure 3:
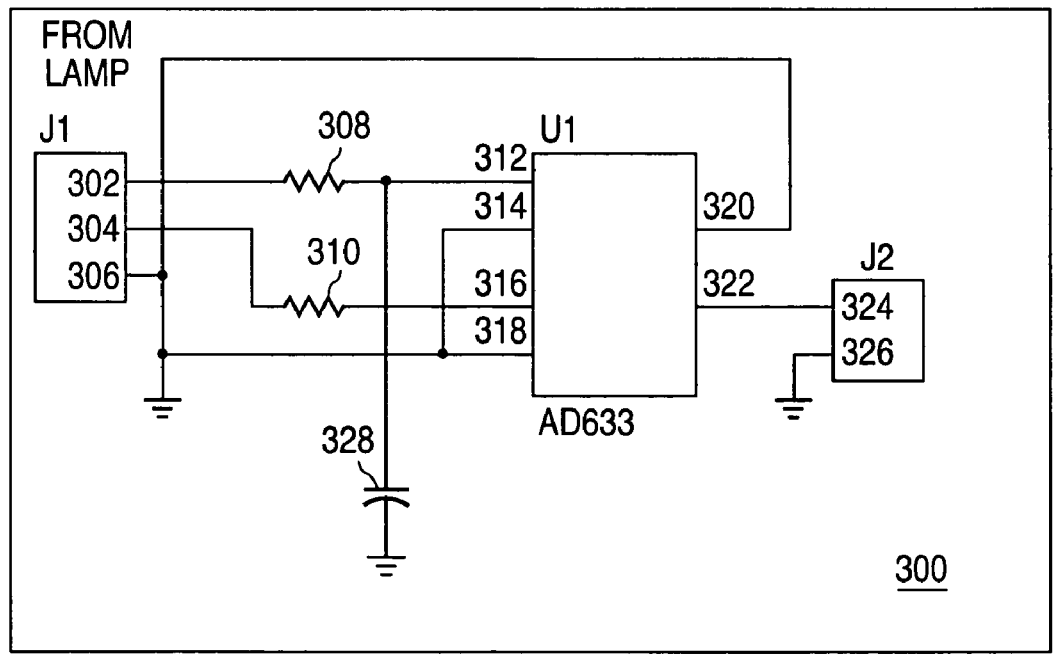
FIG. 3 illustrates an embodiment of the present invention, which provides for control circuitry for a power supply for driving a lamp.
Figure 2A:
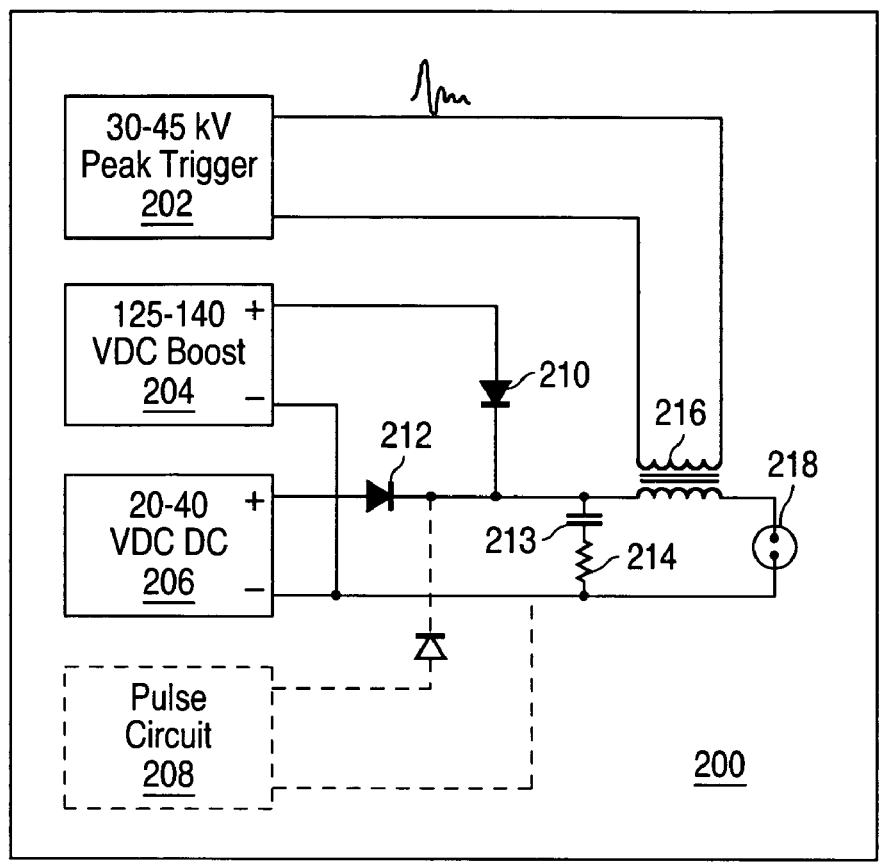
FIGS. 2a-2b illustrate an embodiment of a lamp system of the prior art, and the operation the power supply to start the operation of the lamp.
Figure 2B:
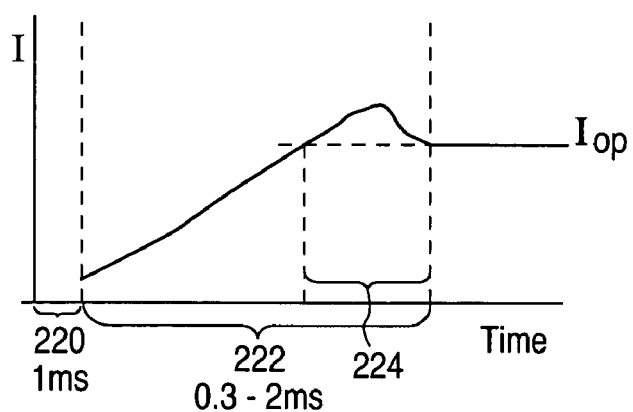

FIG. 3 shows an embodiment 300 of a control circuitry system for a power supply herein. Rather than relying on peak operating voltage, or instantaneous voltage, across the lamp, the system 300 provides for inputting an averaged (could also be referred to as a smoothed or filtered) voltage into a processor which controls the power supply inputting power to the lamp. In the embodiment shown in FIG. 3, a capacitor 328 is provided at the input to the power calculation circuit U1, which can in one embodiment be an analog multiplier. The capacitor 328 operates to average, or filter, the operating voltage, as it is input to the processor.

Using the capacitor as low pass filter as shown in FIG. 3, is a very simple method to achieve an averaging circuit, or smoothing circuit, in some applications it typically only requires the addition of a single capacitor to the circuit (in some cases depending on the system parameters a resistor and capacitor in series is needed). The use of a filtering capacitor provides for constant power type operation while delaying the response time, in terms of changing the current driving the lamp, on any fast operating voltage changes, which achieves elimination of oscillatory feedback over a wide frequency range.

A number of other implementations, and variations of the circuit shown can be used in accordance with the teaching herein. An important element of an embodiment of the present invention is to utilize an integration time constant, or averaging time period, of the appropriate value for the characteristics of a lamp used in the system. The integration time constant should be long enough to provide real instability damping characteristics while keeping the overall thermal performance of the lamp within operating specification limits.

It should be noted that some prior commercially available power supplies may provide for suppression of power supply induced switching noise. However, in these prior systems the power supply induced switching noise is very high frequency, in the range of 20 kHz to 500 kHz, and the range of capacitance values used to filter this noise are in the range of 20 pF to 100,000 pF, resulting in a time constant with the series resistor which is in a much different range than that required for filtering out changes, in the voltage due to short term changes in the impedance of the lamp. In some prior systems the time constant defined as T=R1C1 is in the range of 0.1 to 0.000001 seconds, which is appropriate for filtering switching noise of a pulse width modulated power supply (PWM) or switched mode power supply (SMPS), where such noise is in the range of 20 to 500 kHz range.

In one embodiment for adequate suppression of lamp impedance changing processes with the potential for feedback through constant power operation, the voltage feedback circuit time constant or integration time should be larger than 1 second, and could be as long as 10 seconds, although generally it need not be longer than 10 seconds. The characteristics for the filtering can be determined in part by the characteristics of the human eye and human viewing, which are such that a person can perceive a small change in light intensity (down to about 8%) over a 10 second time period.

In FIG. 3, the circuit 300 includes input corresponding to the operating conditions of the lamp. This is represented by J1, with signal 302 corresponding the instantaneous voltage across the lamp, and signal 304 corresponding to the current through the lamp. The resistor 308 and the capacitor 328 operate to smooth, or filter, the input voltage signal prior to the voltage signal being input to the power calculation circuit 1. In one embodiment the value for the resistor 308 is in the range of 10 k ohms, and the capacitor 328 is in the range of 120 μF, and this provides a time constant of 1.2 second, which is significantly longer than other systems which lack filtering for fluctuations in voltage across the lamp, where such changes are due short term impedance changes in the lamp. The power calculation module U1, operates to multiply the smoothed voltage signal which is input to the power calculation circuit at 312, with the current signal with is input to the power calculation circuit at 316. The result of the power calculation is output at 322 where it can be input to a control circuit J2 which controls the output of the power supply.

By using a circuit where R 308 and C 328 have a time constant larger than 0.1 seconds, and preferably in the range of 1 second or greater, significantly improved short term impedance instability reduction is obtained, or stated differently the output power calculation which is used to control the power supply, will not reflect all of the short term fluctuations in impedance variations in the lamp, and thus prove more stable light output a observed by a person viewing the output of the lamp. The RC first order low pass filter can be replaced with any order low pass, or band pass, or notch filter design with proper core frequency selection as a function of the instabilities of the lamp which are to be attenuated. The filter settling time can be optimized as function of the thermal time constant of the lamp and cooling system.

Generally the output of a lamp is represented by:

$L=a*I^b$, with L=measure of luminous flux, a and b being constants based on lamp design and I being the operating current of the lamp.

Electrical power to the lamp is represented by $P=V*I$ with P=power, V being operation voltage and I being operation current.

It is clear from the above that in a CCM power supply the output L will be largely constant regardless of instantaneous voltage changes over the lamp caused by plasma operation or electrode induced impedance changes. On the other hand, any instantaneous change in operation voltage will introduce an instantaneous change in operational power of the lamp or:

$$\Delta P = \Delta V * I \text{constant}$$

We can rewrite the output of the lamp as:

$$L = a*(P/V)^b$$

It is clear that as the operating voltage of the lamp changes due to impedance changes in a CPM power supply, the output will change accordingly or:

$\Delta L = a*(P\text{constant}/\Delta V)^b$ with a,b,L,P and V defined above.

It will be clear to one of skill in the art that reducing the sensitivity to instantaneous changes in the voltage across the lamp can be achieved in a number of different ways, and that the frequency response and circuit settling time needs to be evaluated in function of overall lamp system design. Indeed it should be appreciated that the principles taught herein could be applied to a large number of multiplication schemes, analog, digital or mixed signal techniques.

Current feedback in a xenon short arc power supply should be fast and continuous, but current changes induced by lamp impedance changes, plasma electrode interaction and lamp aging should be very gradual, so as to keep the operating current as constant as possible and minimize any light output modulation by changing operating current.

The drive voltages for the power calculation chips are not shown in FIGS. 1 and 3 as these voltages are determined by the design of the particular chip. A wide range of suitable analog multipliers for above power calculation circuits could be used. For example, some suitable analog multipliers include Raytheon's models RC4200, RC4213, RC4214; and Analog Devices' models, AD532, AD534, AD632, AD633, AD734, AD834, AD835 and Texas Instruments' (formerly Burr-Brown) models MLT04, MPY100, MPY534, MPY634. An advantage of the approach, shown in system of FIG. 3 is its simplicity; a disadvantage is the settling time on power up of the circuit and the low attenuation slope of 6 dB/octave. During the power-up phase of the system the operating voltage will be considered zero. This in turn will drive the power supply in such a way that a maximum current (limit) is applied to the lamp during the power-up phase, and this operation could be turned into a feature for some lamps, used in applications where achieving extend life is not a critical requirement, by adjusting the settling time to be complimentary with the boost cycle of the ballast, simplifying boost circuit design and facilitating the lamp ignition cycle.

Higher Order Low Pass Filter

For faster settling on power up with better control of the attenuation slope and extended frequency range covered by this elementary averaging circuit, one can apply higher order LP filters. Each order will add 6 dB/octave attenuation. Settling time and group delay is function of the filter topology and is subject to compromises made in function of the system design. One versed in the art of electronic filter design will recognize the opportunities offered by the available LP filter topologies described extensively in literature.

RMS Operating Voltage Calculation in Conjunction with Residual Ripple Filter

A number of analog computational circuits are available to accurately calculate average voltage of combined DC+AC signals, as is the case with the typical operating voltage over time. One popular topology is the root mean square (RMS) to DC converter with provides following function:

$$V_{rms} = V_{in}^2 / V_{avg}$$

Any AC frequency applied at the input an RMS circuit will be found as residual ripple at the output of the RMS circuit with double the frequency. A higher order LP filter can be added to attenuate the residual ripple output by the RMS circuit. This combined method avoids oscillatory feedback by reducing the feedback gain over frequency and making sure there's minimal opportunity of locking to the original waveform. Full control over settling time is achieved with a single capacitor while the ripple magnitude is defined by an LP filter of any given order deemed necessary for optimum filtering versus settling time. This RMS-DC converter implementation can be more accurate for calculating operating power as compared to the low pass filter techniques described above.

Figure 4:
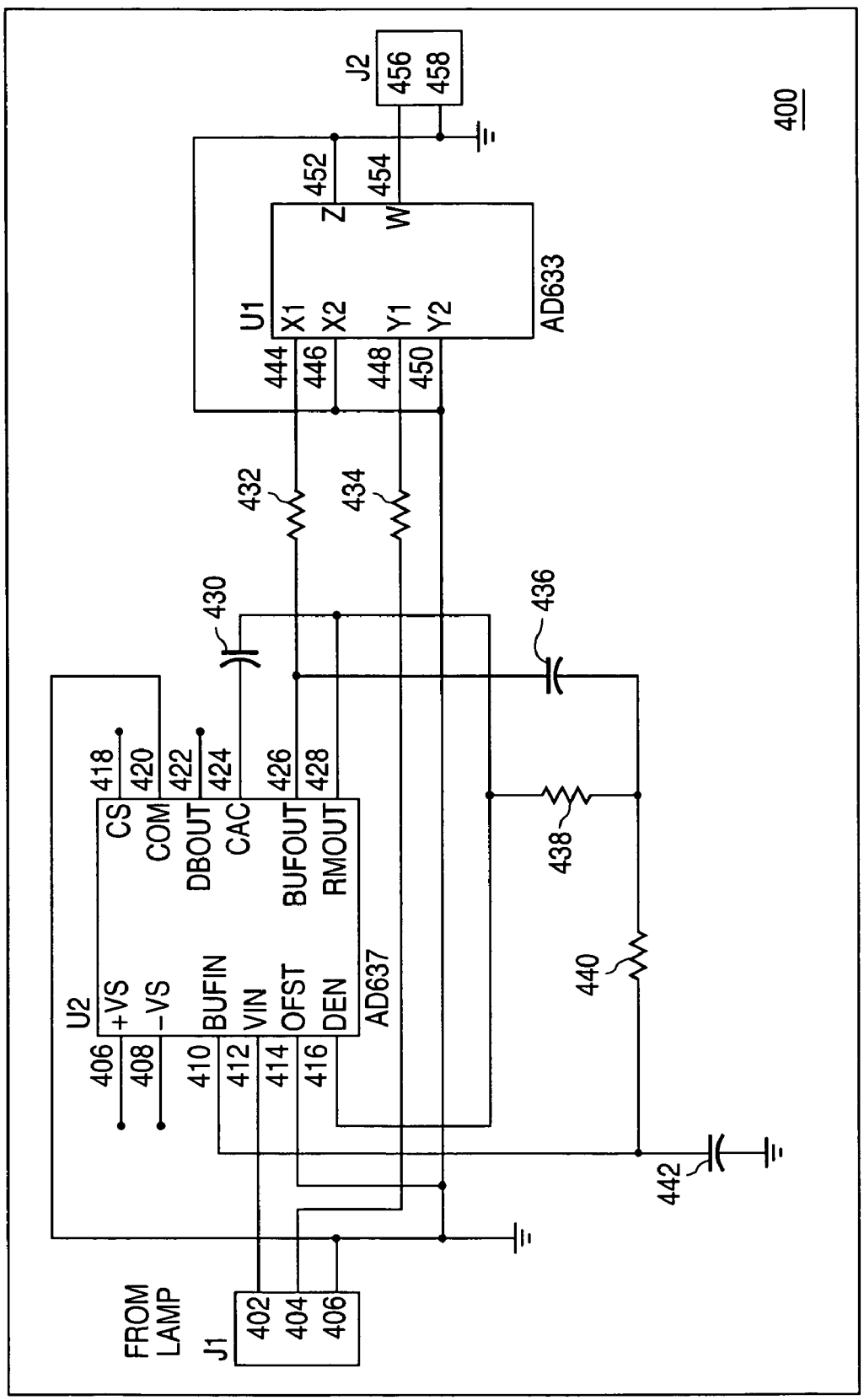
FIG. 4 illustrates an embodiment of the present invention which provides for using an RMS processing circuit, to process a voltage signal which corresponds to the voltage across the lamp.

FIG. 4 shows a system of an embodiment herein which provides for using RMS smoothing of the voltage signal from the lamp. J1 represents the signals corresponding from the lamp, with signal 402 corresponding to the voltage across the lamp, and signal 404 corresponding to the current through the lamp. The current signal 404 is input to the power calculation circuit at 448. The voltage signal 402 is input to a RMS calculation circuit U2 at 412, various other operational inputs and outputs 406-428 for the RMS calculation circuit are provided, but most of these inputs and outputs are for general operational requirements and can vary between different implementations. The output signal 426 is the RMS signal derived from the voltage signal input at 412. The combination of resistors 438, 440 and capacitors 436 and 442 provide for filtering of the output signal 426. This configuration corresponds to a second order Sallen key filter for ripple reduction. Other filter configurations could also be used. For example, shorting resistor 440 and removing computer 436 would provide a first order filter at a reduced cost, but would reduce the output ripple reduction. Capacitor 430 is the integration capacitor which controls integration and settling time. The filtered RMS signal is then input to the power calculation circuit U1 at 444. A power calculation signal based on the signals input at 444 and 448, is then output at 452, and the power calculation signal is the input to a control circuit 456, where it is used to control the current output by the power to the lamp.

Suitable RMS-DC converter chips include, but not limited to; AD536A, AD636, AD637, AD736 and AD737 provided by Analog Devices of Norwood, Mass. One should also recognize these chips can be simulated by discrete electronics part as in the most elementary form a RMS-DC converter using for example a precision rectifier followed by a squarer/divider and an integrator circuit.

The advantage of using a single chip solution is the accuracy that can be obtained without extensive trimming or calibration. Reported accuracy of most products is better than 1%.

Figure 4A:
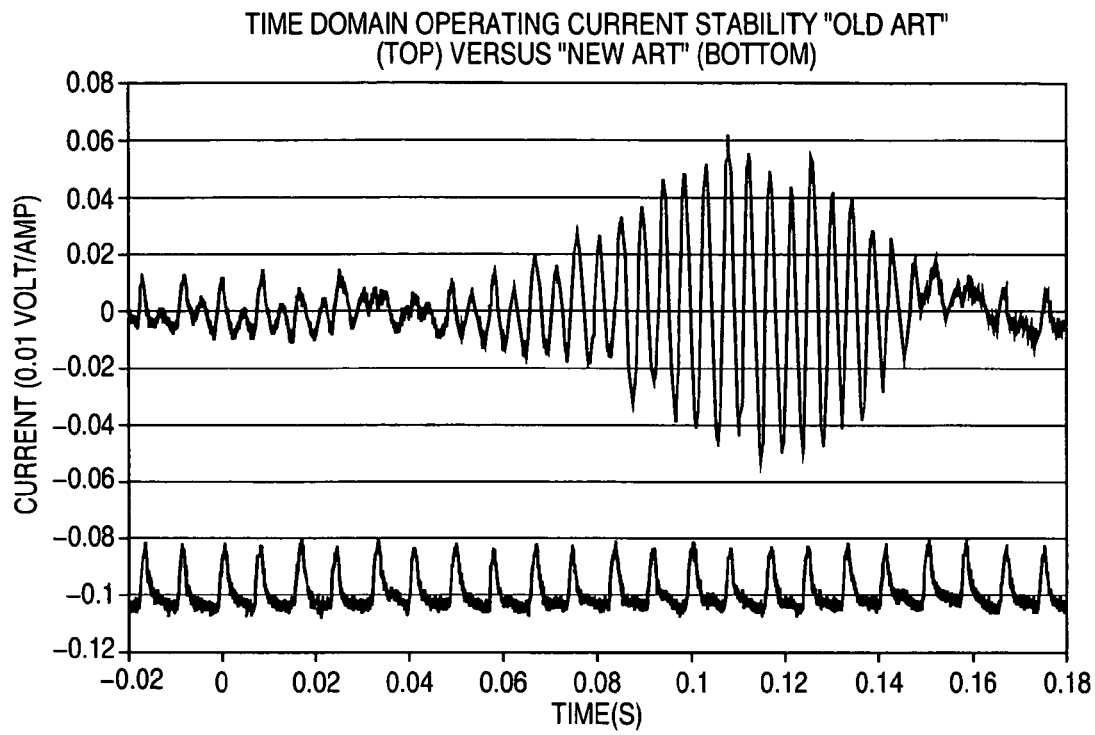
FIGS. 4a-4b show the effect of the circuitry described in FIG. 3 and FIG. 4 on the operating current of the short-arc xenon lamp.
Figure 4B:
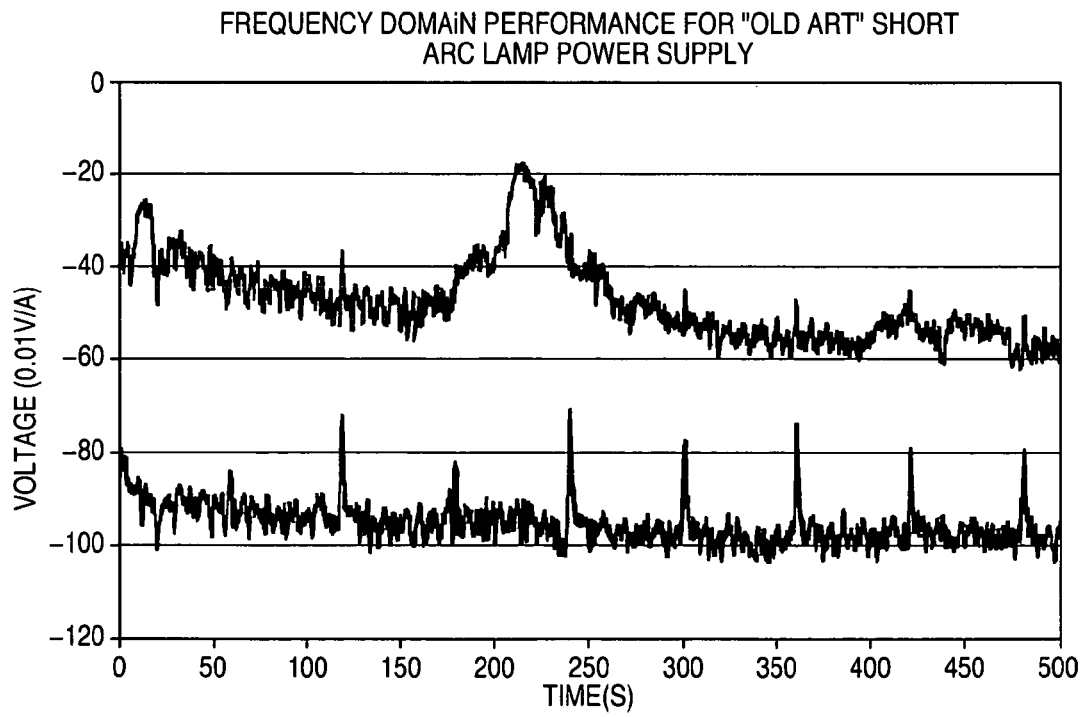

FIGS. 4a and 4b show the effect of the circuitry described in FIG. 3 and FIG. 4 on the operating current of the short-arc xenon lamp. FIG. 4a shows a comparison of the operating current signal between a prior art power supply (top trace) and the subject power supply (bottom trace). One can see significant instabilities in the top trace. FIG. 4b shows a Fast Fourier Transform (FFT) of same signal for a frequency domain comparison. There are major instabilities in the 150-250 Hz range in the top trace. The bottom trace does not show the same instability peak and it can be argued that the lesser instabilities between 20-30 Hz were reduced at least 10 dB in amplitude. (The top trace was shifted 40 dB up for clarity.) The only remaining significant markers in the bottom trace are the fundamental and harmonics of the 60 Hz AC power line which are present by design.

Frequency range and settling time is function of the integration time constant and ripple rejection filter implementation. One should also recognize that the above analog filter design solutions can be implement using counterparts in digital technology. Indeed some advantages can be obtained by using digital signal processing (DSP) and applying such processing to power calculations using the lamp operating voltage and current measurements in lamp ballast.

Analog multiplication chips and RMS-DC conversion chips described above can be relatively expensive and to some extent lack ease of configurability in a case where a power supply has to be real-time re-configured to operate different lamp types. Thus, it should be noted that the above-discussed analog techniques could be achieved using various digital implementations.

In a digital implementation, one requirement is to convert the sensed analog operating voltage and operating current signal from the lamp to a digital format. Implementation and accuracy required will dictate which analog-to-digital/digital-to-analog (AD/DA) conversion resolution to utilize. Similar considerations will also be a driving factor in microprocessor or DSP operating speed selection. Although the multiplication of the current and voltage values for determining a power level is itself a fast process, the smoothing, or averaging, RMS-DC and filtering processes for the operating voltage can be a time and resource consuming process, from a digital processing stand point, so the processor utilized for the processing needs to be sufficiently powerful. Also, depending on the power of the processor being used it is helpful to consider the processing and time demands of the different averaging, or filtering techniques.

Of the different averaging type techniques discussed above the RMS calculation is probably the most demanding from a DSP perspective, and requires the most processor time; because in addition to the multiplication of the operating voltage and current, the digital processor needs to calculate the square out of a number of voltage samples, sum these and divide by the time-constant (windowed) lamp operating voltage average.

Using a running average technique, of adding the last acquired value to the running average and dividing by the number of samples to calculate an average, is a less demanding process. This requires one addition, and one division, for each sample in addition to the multiplication of voltage and current. Typically, even inexpensive, slower microprocessors can handle this type of workload.

Using an adaptive moving average window technique, where rather than keeping track of all operating voltage history for the lamp since power up, one calculates the average over a moving window, is very suitable for less powerful processor. The size of the time window and the sample conversion speeds determines the time constant here. For window sizes that are a power of two, no additions with division are required. As dividing by power factors of 2 can be easily simulated by a right shift of the binary number. Right shifting is a standard logical instruction in most micro controllers or microprocessors. A right shift operation is typically much faster than the corresponding arithmetic division operation. A simple right shift operation with the required amount of bits will suffice. This is another technique very suitable for inexpensive microprocessor use. The average window size can be resized dynamically for changing operating conditions of the lamp.

Any of the above techniques, as well as any number of other techniques for smoothing the operating voltage of the lamp, can be implemented using DSP technology, and the output of the signal processing can be used by a controller to make adjustments to the output of the power supply driving the lamp. In one embodiment the power supply would be a switched mode power supply (SMPS) with pulse width modulation (PWM) processes driving the SMPS based on the power signal output by the power calculation circuit. Further, it is noted that many commonly available SMPS's contain a chip with a circuit for mixed signal processing. In some cases the processing power of the chip in a standard SMPS could be utilized to perform some of the processing described herein, or the mixed signal SMPS chip could be bypassed, and the operation of the SMPS could be directly controlled by a control module using the power signal derived via any smoothing type of operation along the lines discussed above. As stated above, one should recognize that there are a multitude of variants of the circuits described, and process described above using mixed signal digital/analog technology to implement the invention disclosed herein.

Another area of focus in the discussion herein relates to the adverse effects of inrush current or boost during the start up operation of the lamp. This inrush of current can at times be excessive, and can accelerate electrode wear, or burn back, which can result in lamp impedance changing processes during lifetime of the product. As such instability over the life is affected by the boost or inrush current or energy made available through this start-up phase.

As the operating characteristics of the lamp change, ignition behavior and boost energy requirements change over lifetime of the short-arc lamp. Impurities in the gas, and/or worn electrodes, can cause a lamp to require more ignition voltage and boost energy. In the past power supplies for xenon short arc lamps, were designed to deliver adequate boost energy for reliable ignition at end of life situations, a worst-case scenario. The downside of this approach is that the excess boost energy is provided during the early life of the lamp, and this excess energy accelerates the aging of the lamp. Few studies have been done to document this but it is common understanding the high inrush current during the boost phase required for end of life ignition erodes the cathode by evaporation of the tungsten. The evaporated metal is deposited on the anode, wall or reflector and some materials end up contaminating the fill gas, rendering ignition more difficult. (It is believed that one study in the late sixties showed that each ignition of a multi-kW xenon lamp could take about 30 minutes of the lifetime expectancy of the lamp.)

The same risk occurs when the cathode is still hot after the lamp has been switched off. A hot re-strike is possible but more material can be evaporated during the peak boost current, as a function of cathode temperature at the moment of re-strike. Adjusting boost energy as a function of lamp shut down time could increase useful lamp life.

An embodiment of power supply circuit herein provides for more control over the amount of current or energy applied to the lamp during the ignition of the lamp, and this control allows for the amount of excess current applied to be reduced. This reduction in current can extend the lifetime of the lamp by keeping the electrodes in good condition over a longer time period, and the introduction of other instabilities over the life of the lamp is delayed.

Figure 5A:
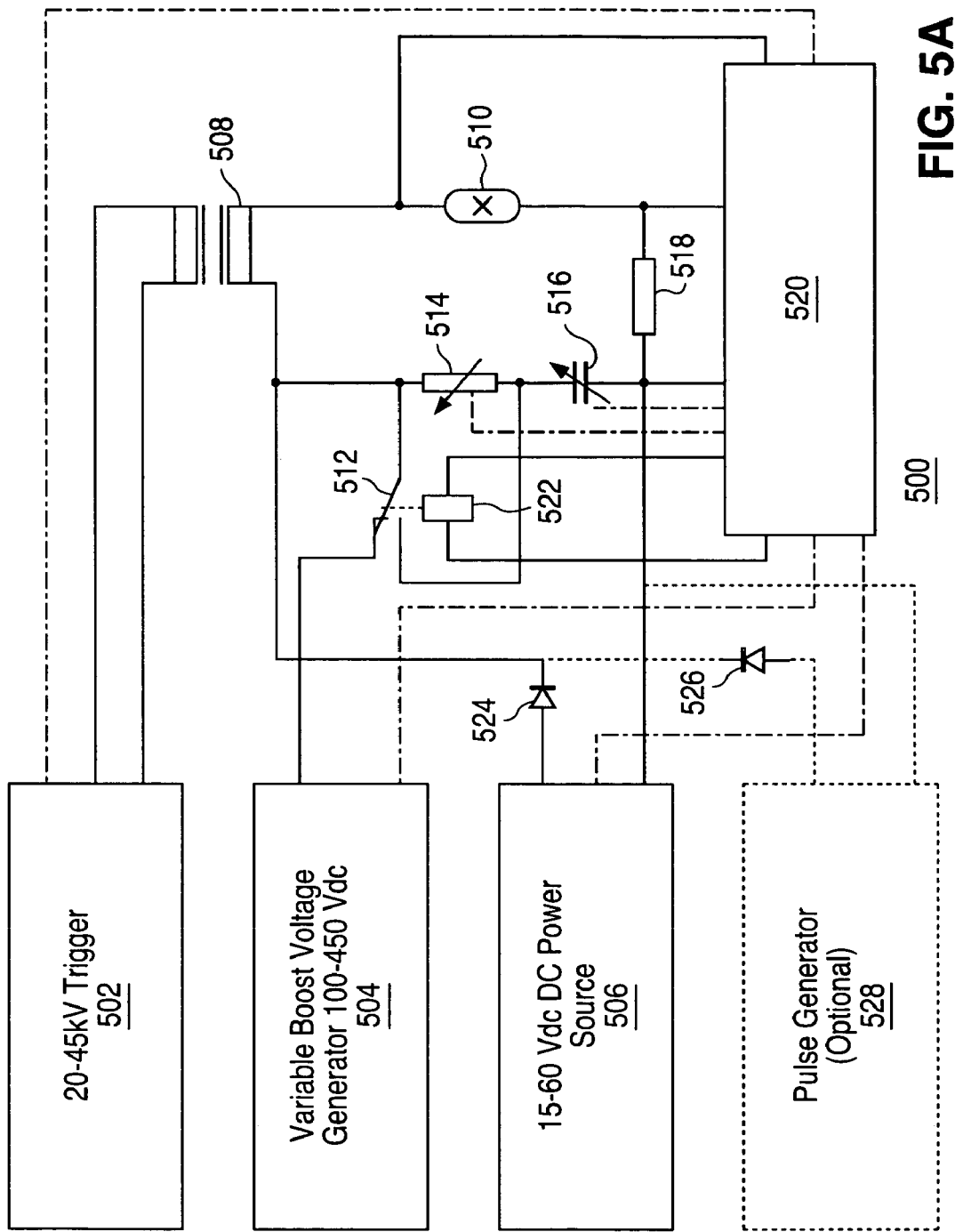
FIGS. 5a-5b show and embodiment of the present invention, which provides for enhanced control over the ignition phase of the lamp operation.
Figure 5B:
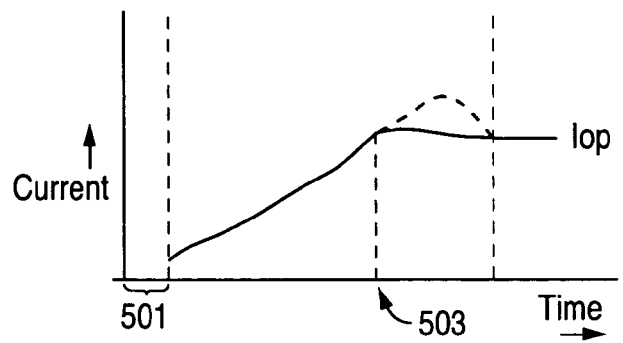

FIG. 5a shows system 500 for improved performance during the start up phase of lamp ignition. The trigger voltage source 502 applies an initial start up voltage to the trigger transformer 508, which in turn will apply the trigger voltage to the lamp 510. In one embodiment the trigger voltage will be applied for a time period in the range of approximately 1 µs, as shown in FIG. 5b, as time period 501. Subsequent to the application of trigger voltage, a boost voltage from the boost voltage generator 504 will be applied to the lamp 510. In one embodiment this boost voltage will be applied for a time period in the range of 0.3 to 2 ms, and a current sensor, or a current shunt, 518 will sense the current transmitted through the lamp will be sensed, and a signal from the current sensor will be transmitted to a processor 520 which will send a signal to a switch actuator 522, which will open the switch 512, and thereby limit the application of the boost voltage to the lamp 510, once the processor 520 determines that the current through the lamp has reached the desired operating current range. Once the current through the lamp has reached the desired sustained operating current, at time 503, in FIG. 5b, then the DC power supply 506 can apply sufficient voltage across the lamp to maintain the desired sustained operating current through the lamp 510. The sustained operation current is the current which is used to drive the lamp over an extended amount of time to provide a steady output light which a human eye will observe as a stable light illumination for a period of operation of the lamp.

This operation can thus limit the current transmitted through the lamp 510 at ignition and thereby prevent an excessive amount of current going through the lamp. It should be noted that the boost voltage, trigger voltage, and DC voltage are largely a function of the lamp operating power and can be selected depending of the characteristics of the lamp.

By increasing the boost voltage over life of the lamp, one can affect the boost energy applied to the lamp immediately after trigger voltage. There are of course a range of different modifications to the system 500 shown in FIG. 5a, which can be used to achieve the adjusting of the boost voltage over the life of the lamp. For example, the processor 520 could provide a function as a strike counter, so that could be used to control the amount of applied boost voltage based on the number of the time that the lamp has been ignited. Indeed, in one embodiment, the system could use a microprocessor or embedded micro-controller with a boost energy curve programmed into it as a function of the lamp operating characteristics, such that a desired boost voltage or energy is determined based on the history of lamps usage. It should also be clear that the time for hot re-strike (or re-ignition shortly after lamp was turned) can be evaluated in a similar way and control of the boost energy required for reliable re-ignition with minimum electrode abuse or wear and tear can be determined based on stored characteristics for the lamp.

In one embodiment a variable boost resistor 514 will control boost energy in similar way as the variable boost voltage, indeed the variable boost resistor could be used instead of, or in addition to, some of the other variable elements shown in FIG. 5a. RC timing (where R is element 514 and C is element 516) or discharge timing will change and has to be evaluated relative to the function of the lamp and power supply system. A scheme utilizing a variable resistor can be attractive in a switched topology where a second boost resistor is switched in parallel or in series with the main resistor to yield a higher or lower resistance value. It should be clear that this method could be expanded to a number of resistors to cover a wider operating range or fine-tune the process.

In one embodiment a variable boost capacitor 516 can also be used to control boost energy in similar way as the variable boost voltage. A variable boost capacitor can be used in place of, or in addition to, the other variable elements shown in FIG. 5a. As the value of C in the RC changes the discharge timing will change and has to be evaluated as function of the lamp and power supply system. Use of a variable capacitor can be attractive in a switched topology where a second boost capacitor is switched in parallel or in series with the main capacitor to yield a higher or lower value of capacitance. It should be clear that this method could be expanded to a number of capacitors to cover a wider operating range area or fine-tune the process.

A number of combinations of the above elements can provide different circuits to supply sufficient energy during the boost cycle to ensure successful ignition, but reduce current overshoot. This process can be automated by measuring the impedance of the lamp during ignition, calculating the required energy to reach stable plasma discharge and driving the boost circuit dynamically to reach the intended operating current.

In one embodiment the processor 520 can provide extensive control over the different elements of the system. For example, the processor 520 can provide control over DC power source based on the sensed current, and make power calculations based on the sensed current and the operating voltage of the lamp; the processor can also control a boost resistor and boost capacitor, and the boost voltage supply, and track the ignition history and operation history of the lamp.

Any of the above solutions properly implemented will limit electrode erosion, and as such limit lamp instabilities caused by changing electrode morphology, wherein the performance of the lamp/power supply system will be improved when it comes to oscillatory feedback modes based on impedance changing processes.

Switching the ignition capacitors in and out over lifetime of the lamp can also improve ignition EMI in the system, as less energy is required for a new lamp.

Again referring to FIG. 5a, system 500 shows an overview of the enhanced ignition and boost energy topologies. The processor/controller 520 in one embodiment will be an embedded microcontroller or DSP chip taking operating parameters (voltage, current, temperature) from the lamp and dynamically controlling ignition, boost energy timing and magnitude as a function of the application's needs.

One of skill in the art will recognize the various combinations using a variable boost voltage source, with an adjustable boost resistor and a boost capacitor could be used. There are a variety of ways to implement these variable or switchable components The boost switch 512 serves a dual purpose; it disconnects the boost circuit (with R 514 and C 516) from the boost voltage generator upon successful ignition and at same time shorts the boost resistor so the boost capacitor effectively reduces the AC output ripple of the power supply. This functionality of the relay can be replaced by properly configured MOSFET switches for a full solid-state implementation of this feature.

Less complex, more economical implementations of embodiment 500 could be accomplished with hard-wired logic or state-machines and correction for the boost energy could be achieved by adjusting the boost resistor or voltage in a simple time scheme. Some advantageous implementations would recognize the need for more boost energy by counting time, ignition cycles, or just adjusting energy when ignition/boost cycles result in misfire.

Figure 6:
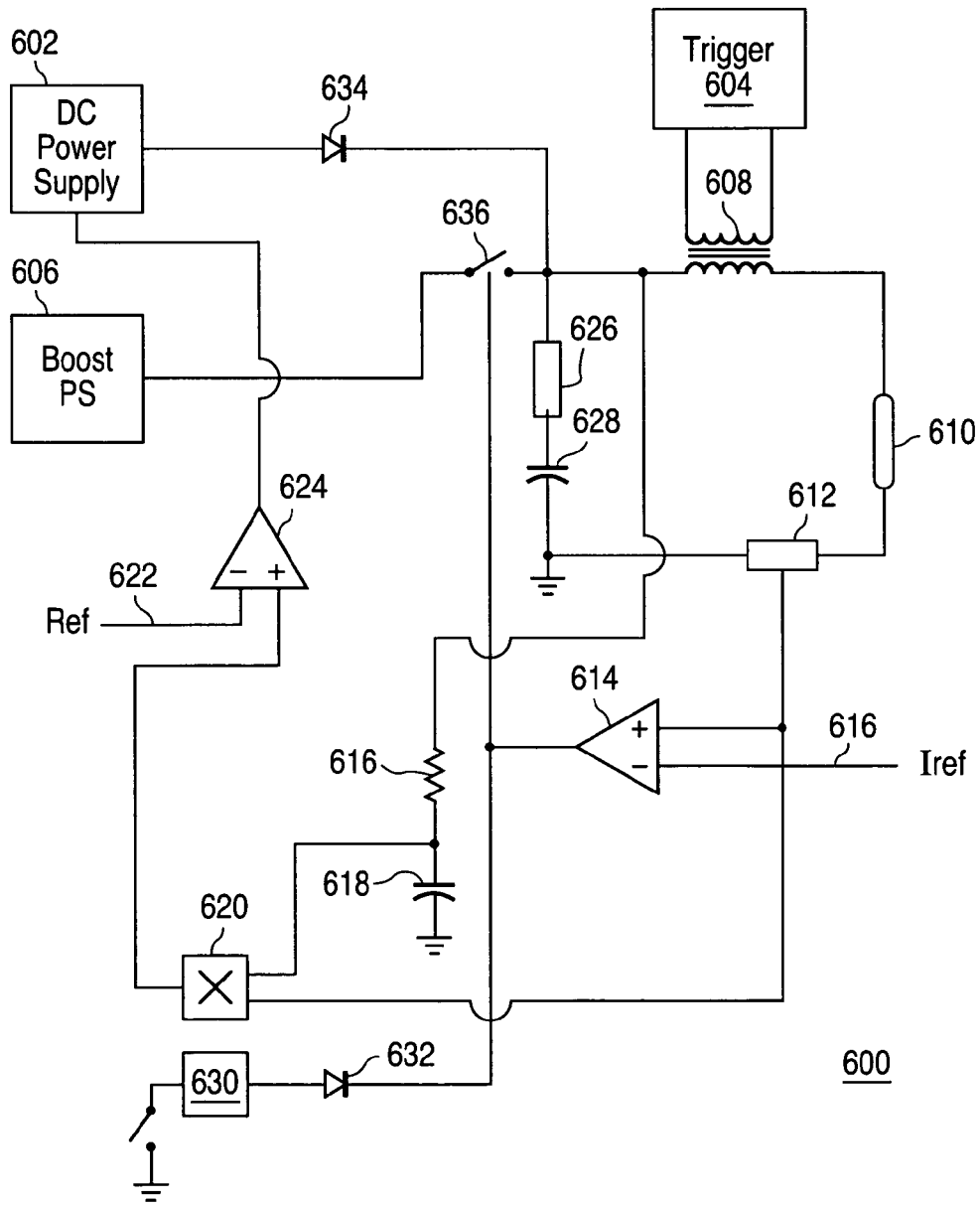
FIG. 6 shows an embodiment of the present invention which provides for both enhanced control over the ignition phase of the lamp operation, and for enhanced control over the power supply to provide for more consistent output intensity by the lamp.

FIG. 6, shows an embodiment herein which provides improved control over the current driving the lamp during steady state operation, and which provides for improved lamp ignition start-up operation. Initially at start up the trigger voltage supply applies a high voltage trigger pulse to the trigger transformer 608. The trigger transformer 608 transfers the trigger pulse to the lamp 610. The trigger pulse voltage is applied across the anode and cathode electrodes of which energizes the gas of the lamp. The boost power supply 606 provides a boost voltage which can be stored in part in the boost capacitor 628. After the trigger pulse has energized the gas in the lamp, the boost voltage will input further energy into the lamp 610, which will cause an increase in current flowing through the lamp, as the gas in the lamp becomes more conductive, the current will increase. A current sensor, or current shunt, 612 will output a signal corresponding to the amount of current flowing through the lamp. A comparator 614 will compare the sensed current, with a reference current 616, and when the sensed current is found to have reached the reference current level, the output of the comparator will cause a boost switch 636 to open, at which point the DC power supply 602 will be able to supply sufficient voltage to the lamp to keep an operating current flowing through the lamp.

Once the DC power supply 602 is driving the lamp 610 during normal operation, the current signal from the current sensor 612 will be input to a power calculation module 620, which could for example be an analog multiplier. A voltage signal is also input to the power calculation module. The voltage signal corresponds to the voltage across the lamp, and this signal is provided by a voltage detector which could be as a simple as a an electrically conductive path connected to the input voltage of the lamp (of course a range of different voltage detectors could be used) and the sensed voltage is transmitted through a resistor 616, and filtered, or smoothed, using a capacitor 618. Of course, as discussed above in detail above a range of different techniques and processes could be used to achieve the filtering or smoothing, and in general such processes can be referred to as being done by a voltage signal processing module. This smoothed voltage signal, is then used by the power calculation module 620 along with the current signal, to provide an output power signal with is input to a comparator 624. The comparator 624 can then function as a control module to compare the power signal with a references 622, and to cause the output of the DC power supply to increase, or decrease, the power output by the DC power supply.

An initial operation switch 630 is provided which could provide input to different elements of the system to initiate operation of the lamp system in response to, for example, a user pushing a start button.

It should be noted that the system shown in FIG. 6 could of course be modified in a multitude of different ways to incorporate other elements of variations embodiments of different systems and methods described above. Indeed, one embodiment would provide for utilizing more digital processing and less analog processing than shown in FIG. 6. For example, both the current signal and voltage signal from the lamp could be digitized and the processed by a single processor which could provide a voltage processing module for smoothing or filtering the digitized voltage signal, and a power calculation module for calculating the power based on the digitized voltage signal and digitized current signal, and a controller module which would then output a control signal to the DC power supply to control the DC power supply based on the calculated power signal, generated by the power calculation module.

Figure 7:
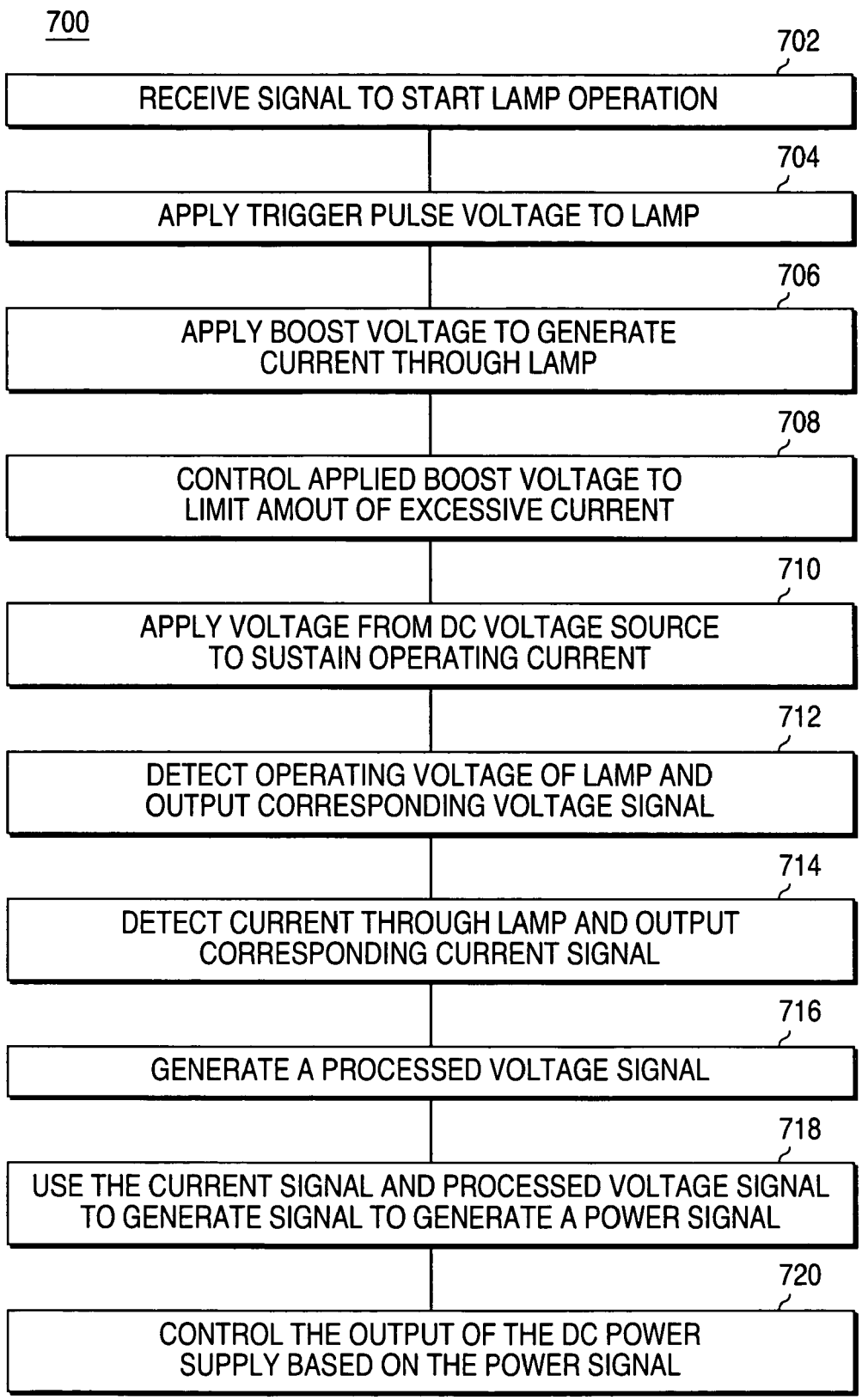
FIG. 7 shows an embodiment of a method of the present invention which provides for an improved start operation, and control over the operation of the DC power supply based on a processed voltage signal.

FIG. 7 is flow chart illustrating a method 700 of the invention herein. This flow chart shown in FIG. 7 illustrates a combination of various elements which are discussed in detail above, and shows a combination of a method herein for providing for controlled application of a boost voltage at start-up of the lamp to avoid excessive current, and use of a smoothed voltage signal in conjunction with a constant power mode type of operation for control of the DC voltage source. It should be noted that the start up method, and the constant power mode type of operation could be implemented separately, or in combination with each other.

In the method 700, the initial step would include receiving 702 an input signal indicating a user's desire to initiate operation of the lamp. In response to receiving the signal, a trigger voltage is applied 704 to the lamp. This trigger voltage energizes the gas in the lamp, so that a boost voltage can induce a current through the lamp. Thus, following the application of the trigger voltage, boost voltage is applied 706 to the lamp to generate a current in the lamp. In conjunction with applying the boost voltage to the lamp, the amount and duration of the boost voltage is controlled, so that an excessive current is transmitted through the lamp.

As discussed above the control of the boost voltage can be achieved in a number of different ways. For example, the boost voltage could be controlled based on the historical operation of the lamp, which could provide for applying a larger boost voltage, or a longer period of burst voltage to an older lamp, which has a larger lamp impedance due to electrode burn back, or other issues. The boost voltage applied to the lamp could also be controlled based on an amount of current flowing through the lamp, such that when a desired amount of current is being transmitted through the lamp, the boost voltage is disengaged, and the DC power supply takes over the driving of the lamp. In general the control of the boost voltage, operates so that a lamp at early life stages will have less boost voltage energy applied to the lamp, and later life stage lamp will have a greater boost voltage energy applied to the lamp.

Once a desired amount of current is flowing through the lamp, power from a DC voltage source is used to sustain 710 an operating current through the lamp. During the operation of the lamp, which the DC source is driving the operating current through the lamp, the operating voltage of the lamp is detected 712 and a signal corresponding to this voltage is output. While the operating voltage is being detected the current through the lamp is also being detected 714 and a current signal corresponding to the detected current is output. The output voltage signal is processed, along the lines of one of the numerous procedures discussed above to generate 714 a processed voltage signal. The processing of the voltage signal operates to reduce the change in the voltage signal to short term fluctuations in the impedance of the lamp. The processing of the voltage signal could include filtering either using analog or digital filters, or providing for an RMS of the voltage signal, etc., where the effect of the processing is to smooth out changes in voltage signal caused by changes in the lamp impedance. The processed voltage and the current signal area used to generate 718 a power signal. A controller then uses the power signal to make adjustments to the output of the DC power supply which sustains the operating current being transmitted through the lamp.

FIG. 8 shows the ignition phase current of a lamp for both a conventional prior art lamp power supply and a power supply with the features of FIGS. 5a-b, FIG. 6 and FIG. 7. As can be seen in FIGS. 8A and 8B, the boost current generated by a prior art power supply rises quickly to high peak. In contrast, and as seen in FIGS. 8C and 8D, using the circuits of the present invention will limit the inrush current in the lamp and therefore reduce the stress on the electrodes during start-up. This reduction positively improves the lifetime of the short-arc xenon lamp.

Figure 8A:
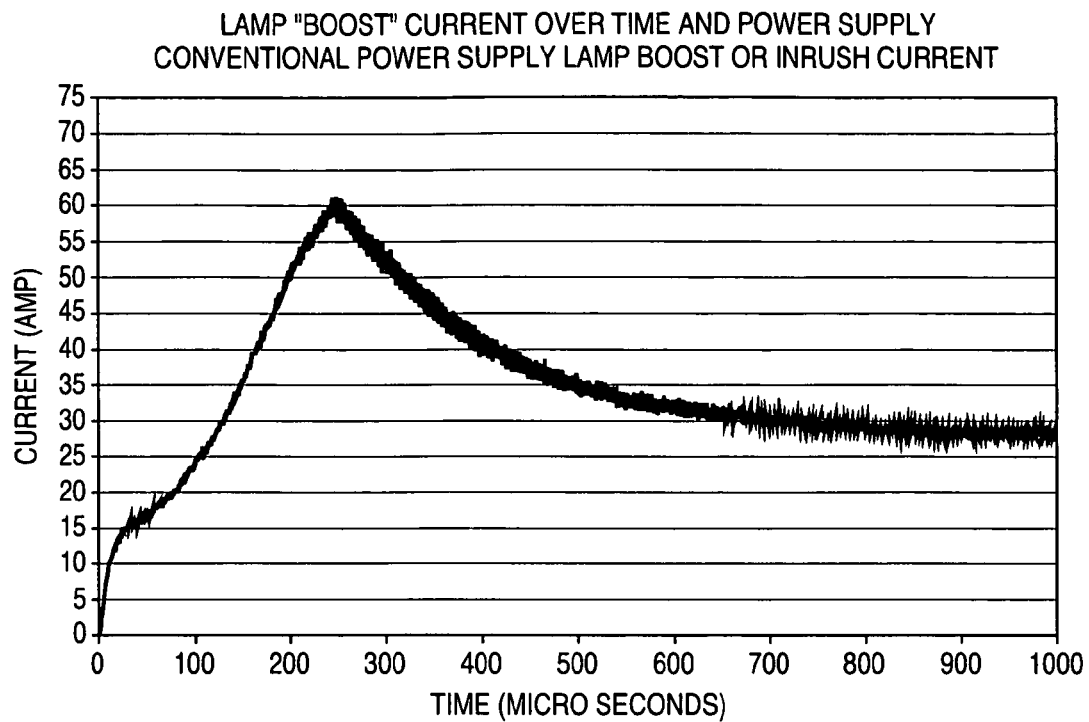
FIGS. 8a-d show the ignition phase current of a lamp on both a conventional lamp power supply and a power supply with the features of FIGS. 5a-b, FIG. 6 and FIG. 7.
Figure 8B:
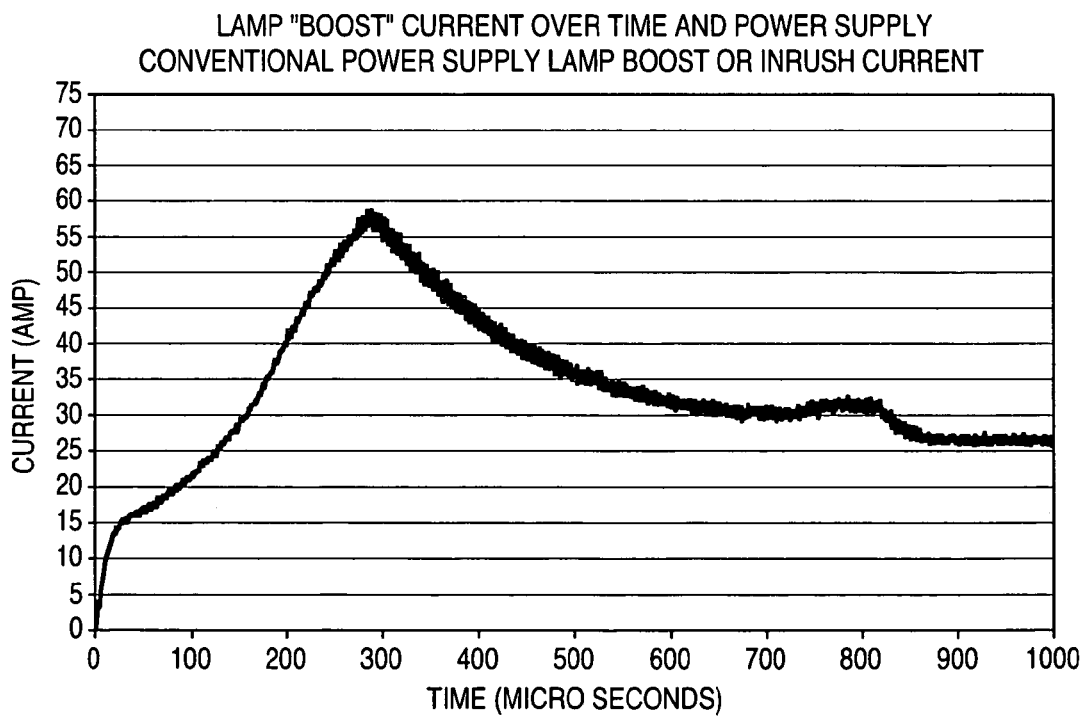
Figure 8C:
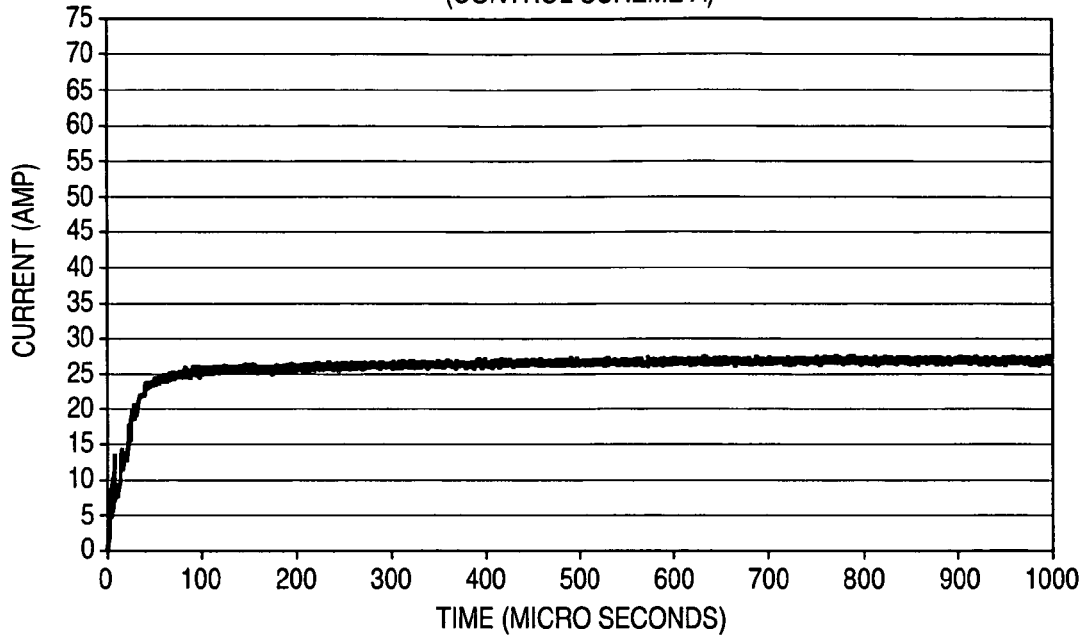
Figure 8D:
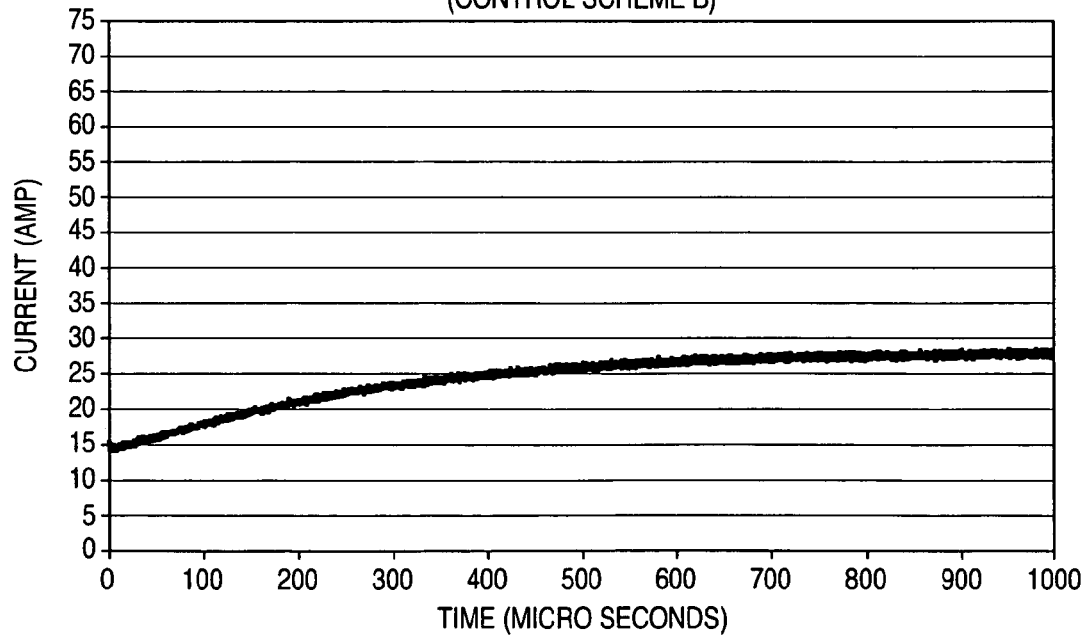

FIGS. 8C and 8D represent two somewhat different control schemes. The difference in ramp up timing of the current was achieved by modifying the software on a prototype implementation. By changing certain time constants in the calculations, it is possible to vary the operating current ramp-up time in a significant way. These changes ultimately relate to the operation of the system in steps 706 and 708 of FIG. 7. Varying the time constants of the circuit also provide a tool to evaluate wear and tear on electrodes over time.

Although only specific embodiments of the present invention are shown and described herein, the invention is not to be limited by these embodiments. Rather, the scope of the invention is to be defined by these descriptions taken together with the attached claims and their equivalents.

The invention claimed is:

1. A power supply system for driving a lamp, comprising:
   a DC power supply coupled with the lamp;
   a current sensor which senses an amount of current transmitted through the lamp, and generates a current signal corresponding to the amount of current transmitted through the lamp;
   a voltage detector which detects the voltage across the lamp and generates a voltage signal corresponding the voltage across the lamp;
   a voltage signal processing module which receives the voltage signal, and outputs a processed voltage signal, wherein the voltage signal processing module operates to smooth out fluctuations in the voltage signal due to changes in the impedance of the lamp;
   a power calculation module which generates a power signal using the processed voltage signal and the current signal; and
   a controller module which controls the output of the DC power supply to the lamp based on the power signal.

2. The power supply of claim 1, wherein the voltage signal processing module includes an analog filter having a resistor and capacitor in series.

3. The power supply of claim 2, wherein the resistor and capacitor in series have a time constant of greater than 1 second.

4. The power supply of claim 1, wherein the power calculation module is an analog multiplier having a first input and a second input, and the processed voltage signal is input to the fist input of the analog multiplier and the current signal is input the second input of the analog multiplier.

5. The power supply of claim 1, wherein the controller module is a comparator having a fist input and a second input, and the comparator receives the power signal at the first input of the comparator, and the comparator receives an input reference signal at the second input of the comparator, and the comparator outputs a control signal to the DC power supply based on a comparison of the power signal and the reference signal.

6. The power supply of claim 1, wherein the voltage signal processor includes a low pass filter having a corner frequency in the range of 0.16 Hz or less.

7. A method for driving a short arc lamp, the method comprising:
   transmitting an operating current through the lamp;
   generating a current signal corresponding to an amount of current transmitted through the lamp;
   generating a voltage signal corresponding to a voltage across the lamp; smoothing the voltage signal to reduce fluctuations in the voltage signal due to changes in the impedance of the lamp;

generating a smoothed voltage signal;
generating a power signal using the current signal and smoothed voltage signal; and
controlling the operating current transmitted through the lamp based on the power signal.

8. The method of claim 7, wherein the transmitting an operating current includes:
driving a DC power supply to apply a voltage across electrodes of the lamp.

9. The method of claim 7, wherein the smoothing the voltage signal includes passing the voltage signal through an analog filter having a time constant of at least 1 second.

10. The method of claim 7, wherein the smoothing of the voltage signal includes passing the voltage signal through a filter selected from an analog filter have a time constant of at least 1 second, and a digital filter having a time constant of at least 1 second.

11. The method of claim 7, wherein changes in the voltage signal due to changes in the impedance of the lamp, which are in the frequency range of, 10 Hz-2 kHz are attenuated by at least a factor 2.

12. The method of claim 7, further wherein:
generating a voltage signal includes sensing the voltage across the lamp and outputting a first signal corresponding the sensed voltage and digitizing the first signal; and
generating a current signal includes sensing the current transmitted through the lamp and outputting a second signal corresponding the sensed current and digitizing the second signal.

13. A method for starting the operation of a gas containing lamp, the method comprising:
applying a high voltage trigger pulse to the lamp;
thereafter, applying a boost voltage to the lamp, said boost voltage being lower than the voltage of the trigger pulse, said boost voltage being applied in a manner sufficient to drive the impedance in the lamp low enough so that the gas will be sufficiently conductive to permit sustained operation of the lamp with a lower operating voltage while not driving a significantly excessive amount of current through the gas;
using a DC power supply to supply said lower operating voltage to sustain an operating current through the lamp.

14. The method of claim 13, further comprising:
sensing a current being transmitted through the lamp in response to the application of the boost voltage; and
terminating the application of the boost voltage when the sensed current reaches a predetermined level.

15. The method of claim 13, further comprising:
adjusting the applying of the boost voltage based the number of the times that the lamp has been started up, such that an amount of energy applied to the lamp by the applied boost voltage is increased, as the number of times the lamp has been started up increases.

16. A power supply system for a gas containing lamp, including:
a trigger voltage source coupled with the lamp to apply a trigger voltage to the lamp to energize a gas in the lamp at a start of operation for the lamp;
a boost voltage supply for supplying a boost voltage to the lamp;
a DC power supply coupled with the lamp to apply a sustaining operating current being transmitted through the lamp, after the boost voltage has been applied to the lamp wherein the trigger voltage is higher than the boost voltage which in turn is higher than the voltage supplied by the DC power supply; and
a controller coupled with the boost voltage supply, and which operates to control the boost voltage power supply so that an amount of energy applied to the lamp by the boost voltage power supply is sufficient to drive the impedance in the lamp low enough so that the gas will be sufficiently conductive to permit sustained operation of the lamp with a lower operating voltage supplied by the DC power supply while not driving a significantly excessive amount of current through the gas.

17. The power supply of claim 16, further including:
a current sensor which generates a current signal corresponding to an amount of current being transmitted through the lamp when the boost voltage is being applied to the lamp; and
wherein the controller operates to terminate the application of the boost voltage to the lamp, based on the current signal.

18. The power supply of claim 16, wherein the controller operates to control the boost power supply such that as the lamp ages the energy voltage applied to the lamp is increased.

19. The power supply of claim 16, wherein the controller operates to count the number of times the operation of the lamp has been started, and to increase the energy applied to the lamp by the boost voltage supply as the number of times the operation of lamp has been started increases.

* * * * *